(12) United States Patent
Trummer

(10) Patent No.: US 8,502,548 B2
(45) Date of Patent: Aug. 6, 2013

(54) DISTANCE MEASURING DEVICE AND METHOD FOR DETERMINING A DISTANCE, AND SUITABLE REFLECTING BODY

(75) Inventor: Guenther Trummer, Baiersdorf (DE)

(73) Assignee: Astyx GmbH, Ottobrunn (DE)

( * ) Notice: Subject to any disclaimer, the term of this patent is extended or adjusted under 35 U.S.C. 154(b) by 674 days.

(21) Appl. No.: 12/597,899

(22) PCT Filed: Apr. 28, 2008

(86) PCT No.: PCT/EP2008/003437
§ 371 (c)(1),
(2), (4) Date: May 7, 2010

(87) PCT Pub. No.: WO2008/131957
PCT Pub. Date: Nov. 6, 2008

(65) Prior Publication Data
US 2010/0219851 A1 Sep. 2, 2010

(30) Foreign Application Priority Data
Apr. 27, 2007 (DE) .......................... 10 2007 020 046

(51) Int. Cl.
*G02B 6/00* (2006.01)
*G01R 27/08* (2006.01)

(52) U.S. Cl.
USPC ............................ 324/709; 385/147; 324/716

(58) Field of Classification Search
USPC .................................. 324/709, 716; 385/147
See application file for complete search history.

(56) References Cited

U.S. PATENT DOCUMENTS

| 4,588,953 A | 5/1986 | Krage | |
|---|---|---|---|
| 2005/0150568 A1* | 7/2005 | Dietmeier | 141/95 |
| 2005/0191027 A1* | 9/2005 | Trummer | 385/147 |
| 2005/0266823 A1* | 12/2005 | Cathelin et al. | 455/344 |

FOREIGN PATENT DOCUMENTS

| DE | 102 05 904 A 1 | 8/2003 |
|---|---|---|
| DE | 10 2006 038 469 A1 | 2/2008 |

OTHER PUBLICATIONS

German Language Foreign Search Report dated Oct. 14, 2008, International Application No. PCT/EP2008/003437, (7) pages.

* cited by examiner

*Primary Examiner* — Melissa Koval
*Assistant Examiner* — Farhana Hoque
(74) *Attorney, Agent, or Firm* — Evan Reno Sotirion; The Small Patent Law Group

(57) ABSTRACT

A distance measuring device and method for determining distance, and a suitable reflective member are provided. The distance measuring device includes analysis electronics and a sensor device, which has at least one coupling probe for feeding a transmission signal into a line structure. A reflective member is disposed in the line structure which has a base plate with an attached collar forming a cup-shaped element, and a feed block with a recess into which the collar plunges. The recess has a sealing ring which produces airtightness with the collar, wherein the attached collar is provided on the front face with a plastic plate.

51 Claims, 12 Drawing Sheets

DISTANCE MEASURING DEVICE AND METHOD FOR DETERMINING A DISTANCE, AND SUITABLE REFLECTING BODY

CROSS REFERENCE TO RELATED APPLICATIONS

This application is a filing under 35 U.S.C. §371, which claims priority to and the benefit of the filing date of PCT Application No. PCT/EP/2008/003437, filed Apr. 28, 2008 and German Patent Application No. DE 10 2007 020 046.5, filed Apr. 27, 2007, the subject matter of each of which is hereby incorporated by reference in its entirety.

BACKGROUND OF THE INVENTION

The present invention relates to a distance measuring device, as well as to a method for determining a distance and to a suitable reflective member.

Conventional distance measuring devices are used among other things, for example, for detecting the piston position of fluidic linear drives and pneumatic and hydraulic cylinders. The detection of the piston position on cylinders can be implemented both discretely, i.e. at discrete points, and continuously, i.e. constantly during operation.

A discrete piston position determination is generally required in order to report back the implementation or end of a piston movement to a sequence control system (e.g. SPS) in order to thus be able to initiate the next sequence step, for example.

Predominantly used for this purpose are sensors or sensor devices sensitive to magnetic fields which detect the magnetic field of a permanent magnet which is located on the cylinder piston. The sensors used here are fitted externally to the cylinder tube of the piston cylinder. If the piston moves into the detection range of this type of sensor, the latter recognizes the presence of the cylinder piston through the cylinder tube. For this, the use of non-ferromagnetic materials is predominantly required and so restricts the structural properties and applications of the drive.

If, however, a different position of the piston is detected, the sensor must be correspondingly mechanically adjusted. For each position to be detected, in addition a further sensor must consequently be fitted, accompanied by the associated additional material, fitting, adjustment and installation costs. This generally takes place at the customer's premises. Here the cylinder is often already integrated into a machine which is difficult to access, and adjustment of the switching distances by mechanically moving the externally fitted magnetic switches is no longer possible.

Furthermore, for these externally fitted sensors additional installation space is required. So that the accessibility and robustness of the sensor can be guaranteed, additional structural complexity is often required.

These types of sensor are predominantly in the form of sensors sensitive to magnetic fields and are known as Reed switches, magnetoresistive (MR), giant magnetoresistive (GMR), Hall switches or magnet-inductive proximity switches.

Complex coordination of the magnet to the sensor device is required for detection of the magnetic field. Moreover, with this measuring principle, the possible applications are restricted by interfering static and dynamic magnetic fields (EMV, field of a nearby cylinder) and the temperature characteristics of the sensor.

For the continuous measurement of the piston, position measuring systems are generally used which function potentiometrically, magnetostrictively according to the LVDT principle (Linear Variable Differential Transformer) or according to the ultrasound principle. With these systems the piston position is emitted continuously and predominantly as an analog voltage signal. Sensors according to the LVDT principle always require a reference path when switched on. Magnetostrictive sensors are fitted either externally onto the cylinder or into a hollow piston rod. Both fitting possibilities mean substantially increased complexity, are prone to interference or weaken the stability of the drive in the case of the hollow piston rod. Ultrasound sensors are only suitable to a limited degree for the path measurement in pneumatic and hydraulic cylinders because the measuring accuracy changes with the cylinder pressure. Incremental path measurements are also known as a supplement to these systems. These systems are implemented, for example by the coding of the piston rod, and so can only be used for the relative path measurement.

Neither the continuous nor the discrete piston position determination can be integrated into a cylinder or can only be so with substantial structural complexity and the associated high costs. The substantial structural complexity is due to the fact that all of the established sensor principles described must be adapted to the corresponding cylinder length because the principles have a detection range which is too short.

The ideal path measuring system for determining the piston position in pneumatic and hydraulic cylinders has the following properties:
  continuous, absolute path measurement with an accuracy of 100 pm for positioning the piston
  total integration of the sensor with analysis electronics into the cover of the cylinder
  switching distances should be adjustable externally via an electronic interface (teach-in capability)
  a universally applicable sensor, independently of the cylinder length
  measurement results independent of pressure, oil and humidity in the cylinder
  reliable measurement results, e.g. up to 10 bar pressure and 6 m/sec piston speed in the pneumatic cylinder.

In practice, known measuring systems patent application have the following problems for cylinders with a large diameter (>50 mm):
  The plastic ring for the piston stop and the antenna retainer is very large. These plastic parts are only available up to a diameter of max. 60 mm as ready-made items. For larger diameters expensive custom-built models are required.
  Moreover, plastic absorbs water over time or releases water according to the conditions of use, and in this way changes the measuring conditions. The measurement results then become inaccurate and no longer correspond to the specification.
  Classic end position damping e.g. of the pneumatic piston can only be achieved by the moved brake ring made of plastic at the expense of measuring accuracy.

Further disadvantages of known measuring systems are:
  that the conventional pistons in the pneumatic cylinder are relatively thin and generally have a magnetic ring in the center in order to enable operation with externally fitted Reed switches. These pistons do not form an ideal reflective member for an electromagnetic wave. Part of the electromagnetic wave passes over the piston into the functional space of the cylinder lying behind this, returns with a time delay and interferes with the useful signal. This substantially worsens the measuring accuracy. Furthermore, there are pistons which are made entirely of plastic. These pistons do not constitute a reflective member at all for the electronic wave. The method described, for example, in DE 102 05 904.7 then no longer works at all.

Furthermore, a disadvantage of a piston stop in the cover made of plastic is that the plastic is settled by frequent piston impacts and so the physical conditions in the functional space of the cover change for the high frequency sensor. Moreover, the measuring accuracy worsens.

In addition, with smaller cylinder diameters it is very difficult to integrate the discrete electronics into the cylinder cover. Part of the electronics must then complexly be accommodated externally, e.g. on the cylinder wall.

A device for determining the position of a piston in a pneumatic cylinder is known from U.S. Pat. No. 4,588,953. During the movement of the piston a microwave signal is delivered into the cavity which is bordered by the outer wall of the cylinder and the piston. The reflected microwave signal is received and processed in order to determine the position of the piston.

BRIEF DESCRIPTION OF THE INVENTION

In accordance with one embodiment, a distance measuring device is provided that includes analysis electronics and a sensor device, which has at least one coupling probe for feeding a transmission signal into a line structure. A reflective member is disposed in the line structure which has a base plate with an attached collar forming a cup-shaped element, and a feed block with a recess into which the collar plunges. The recess has a sealing ring which produces airtightness with the collar, wherein the attached collar is provided on the front face with a plastic plate.

In accordance with another embodiment, a method for determining a distance using a distance measuring device is provided. The method includes providing a line structure reflection which has a feed block with a feed region which connects a high frequency (HF) transceiver to a dielectric restraint system with a coupling probe via a waveguide. The method further includes providing a reflective member with a base plate with an attached collar for forming a cup-shaped element, and measuring a distance between a feed point defined by the coupling probe and the reflective member, wherein at least two transmission signals as electromagnetic waves with different frequencies are coupled via the coupling probe.

In accordance with yet another embodiment, a reflective member for a distance measuring device having analysis electronics and a sensor device which has at least one coupling probe for feeding a transmission signal into a line structure and with a reflective member disposed in the line structure which has a base plate with an attached collar forming a cup-shaped element, and a feed block with a recess into which the collar plunges is provided. The recess has a sealing ring which produces airtightness with the collar, wherein the attached collar is provided on the front face with a plastic plate. The reflective member is configured to reflect a high frequency (HF) signal and has a base plate with an attached collar for forming the cup-shaped element.

BRIEF DESCRIPTION OF THE DRAWINGS

By means of the following drawings, various embodiments of the distance measuring device according to the application are illustrated.

DETAILED DESCRIPTION OF THE INVENTION

Figure 1:
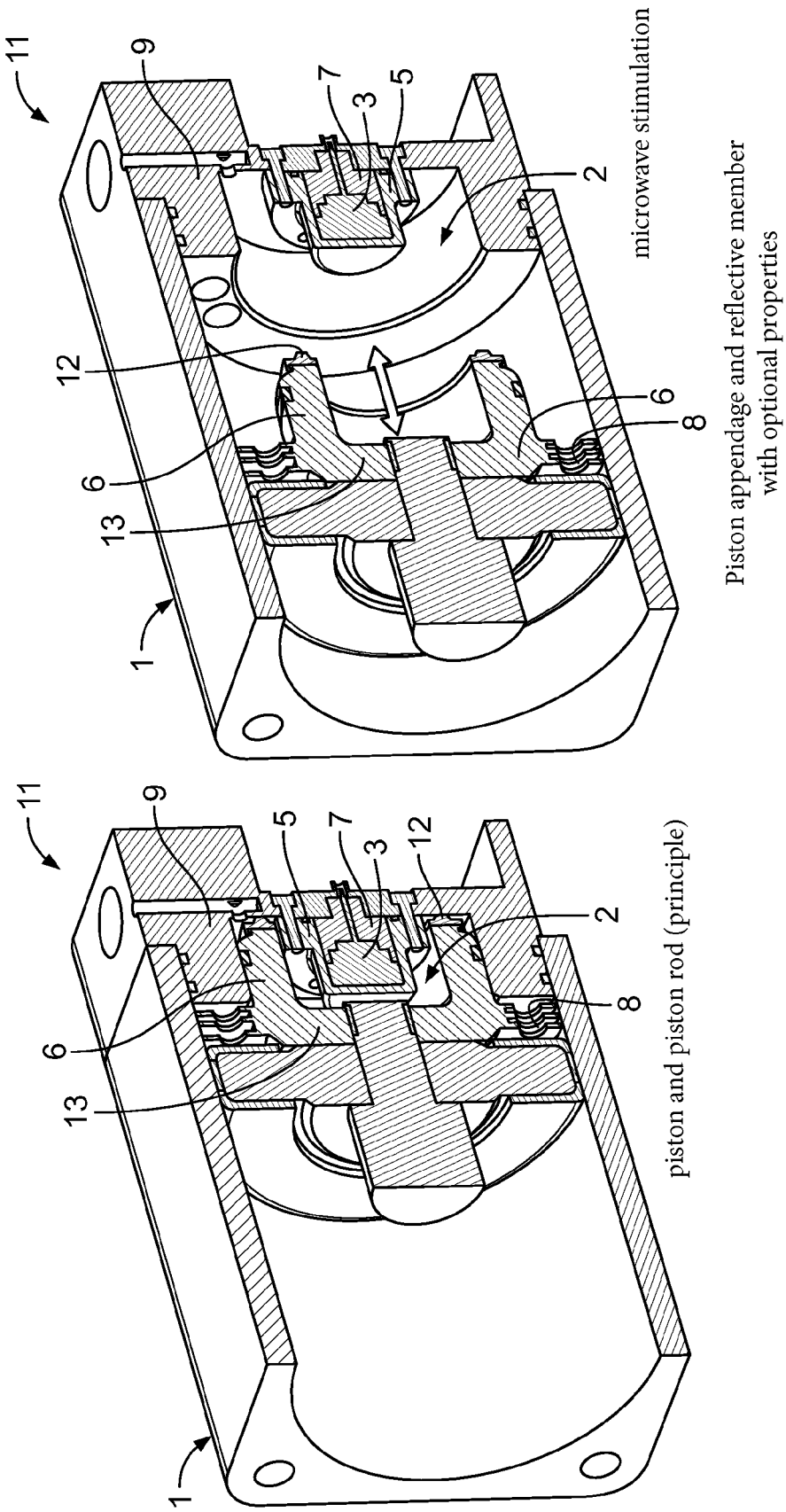
FIG. 1 shows a sectional illustration of the distance measuring device in an integrated line structure.

Various embodiments of the present invention provide a distance measuring device, a reflective member and a method for determining the distance which enable continuous and therefore discretisable distance determination, simple handling and versatile possibilities for use.

According to the various embodiments, it is made possible by the geometric design of the reflective member for the coupling probe to plunge without any contact into the interior of the reflective member, in particular within the collar, upon deflection of the reflective member. Displacement of the position of the coupling probe is prevented and the measuring accuracy retained. Due to the presence of the collar it is possible for the deceleration process of the reflective member to be implemented with a plastic ring which does not effect the distance measurement because the plastic ring is not located within the reflective member.

Furthermore, according to various embodiments a line structure is provided which has a feed block with a feed region which connects an HF transceiver to the coupling probe via a waveguide with dielectric restraint systems. With this arrangement, total integration of the coupling probe with the analysis electronics in the cylinder cover is possible. Therefore, additional parts to be fitted externally are not required. The corresponding switching distances can be adjusted externally via the analysis electronics by means of an electronic interface, The distance measuring device according to the application can basically be used universally independently of the cylinder length. Moreover, it has been shown that the measurement results are reliably correct independently of the pressure, oil and air humidity in the cylinder.

According to various embodiments a distance measuring device and a method for determining a distance is made available, the sensor device having a high frequency feed system which serves to measure a specific distance, for example in a line structure (a line structure being e.g. the interior of the pneumatic cylinder=circular hollow conductor) by radiating and receiving waves, the feed system being integrated into the line structure, for example. Upon the basis of this integration of the feed system it is possible for the distance measuring device to have a small structure and for practically no or only slight structural alterations to be required. Therefore, the overall structure of the distance device can have a clean, sleek design due to dispensing with a fitting possibility for external sensor devices and does not effect the external appearance. With the distance measuring device according to various embodiments economy of installation is achieved because the pre-fabricated cylinder only has one connection cable for control and data collection. According to methods of various embodiments the length of the line structure is measured up to a short circuit (e.g. piston as reflective member with the pneumatic and hydraulic cylinder) which is also moveable. The transmission signal provided is fed into a line structure and preferably reflected by a short circuit (=cylinder piston). In this way the measurement of the distance between the feed point defined by the coupling probe and the short circuit of the line structure is implemented. The distance to be measured here is implemented by measuring the phase difference between the transmitted and the received signal.

More specifically, the arrangement may be provided as follows:

The RF feed system comprises a coaxial monopole stimulation system. By feeding a transversally electromagnetic wave (TEM wave) in the coaxial inlet region (3) a circular hollow conductor wave with the characteristic E field type of the E01 wave is stimulated by the monopole system. This wave propagates within the running cylinder in the axial direction. If this wave strikes a reflective member (within the pneumatic and hydraulic cylinder the piston), the wave is reflected and converted and conveyed into the coaxial line system via the stimulation section (monopole). The monopole feed comprises a 3-stage coaxial transformation stage (2) with a dielectric restraint system (1), for example, made of PPS Gf 40 material, for positioning and pressure stabilisation.

With cylinders with a large diameter the dielectric restraint system is implemented partially in the form of dielectric supports. The piston end stop is formed by a base plate with an attached collar for forming a cup-shaped part (3) made of aluminium which is fitted as an end piece onto the piston. The cup is formed here such that the antenna plunges without any contact within the cup upon impact. A plastic plate (4) is accommodated on the front face of the cup in order to enable a soft impact. This cup additionally serves as a reflective member for the transmitted electromagnetic wave. In order to achieve ideal reflection conditions, around the periphery of the reflective member so-called "corregations" (5) are provided. These are milled grooves which constitute a short circuit for the electromagnetic wave. Depending on the number of grooves an almost perfect short circuit can therefore be produced. In practice 2 grooves are sufficient. The depths of the grooves correspond to a quarter of the wavelength of the transmission frequency of the electromagnetic wave used.

Further embodiments of the reflective member consists of it being able to be designed in order to implement the function of end position damping. Without the end position damping the piston would strike the cover without any deceleration. This leads to jerks and can cause damage to the drive system. The classic end position damping is achieved by the piston rod projecting over the piston towards the sensor and being provided with a conically extending plastic attachment. The counterpiece in the end cover forms a plastic ring, the internal diameter of which is of such a size that the piston rod can plunge with the conically extending plastic attachment. If the internal diameter of the plastic ring corresponds to that of the external diameter of the conical piston rod attachment, the piston is decelerated. In order to enable the cylinder to start up smoothly following a deceleration process, the plastic ring is mounted in the cover so that it can move e.g. a few millimetres axially. If the piston starts up again following a deceleration process, it takes the plastic ring with it up to the stop of the latter. Due to the kinetic energy which the piston then has, there is a gentle jolt and the plastic ring is released from the conical plastic attachment of the piston rod. The deceleration process is supported by an air exchange between the cover and the cylinder space adjustable by means of a screw.

The disadvantage for the HF path measuring system is that the movement of the plastic ring within the cover space changes the physical circumstances for the sensor and the measuring accuracy consequently worsens substantially. Basically the classic end position damping can also be implemented with the configurations described herein. The plastic ring sits in the cover and the conical extension of the piston rod is provided on the reflective member. The movement of the plastic ring is now masked by the cup, i.e. the sensor signals can no longer be interfered with by the antenna plunging into the cup due to the movement of the plastic ring. Another embodiment is achieved when the work scheme is reversed. The moveable plastic ring is now fitted onto the outer surface of the cup and the cover plunge surface is formed conically and coated in plastic. The movement of the ring over the reflective member does not effect the electromagnetic wave because the plastic ring is no longer located in the vicinity of the antenna. Likewise, the pneumatic pressure compensation is provided in the cover. All of the plastic parts directly next to the monopole antenna are made of a plastic material with low water absorption such as e.g. PPS Gf 40.

The whole pneumatic cylinder between the piston rod and the rearward cover is observed during the process introduced e.g. as a circular hollow conductor. According to the geometric dimensions of the cylinder the transmission frequency of the sensor is chosen such that monomodal propagation of the electromagnetic wave (in the example in the E01 mode) is possible. Stimulation of hollow conductor modes of a lower order is prevented by the geometry of the feed. The stimulation of the electromagnetic wave in the cylinder is implemented e.g. via a monopole (=antenna) as described. According to the reflectometer principle the wave propagates in the circular hollow conductor (=pneumatic cylinder) and is reflected on the piston (=short circuit). In order to be able to measure the distance between the piston and the sensor continuously, the transmission signal is modulated. This can take place in the form of a frequency modulation or by analyzing the phase difference between the transmitted and the received signal with a number of frequencies. The transmission frequency is generally between 100 MHz and 25 GHz, but other frequencies may be used.

The use of a dielectric secondary ring serves as a stop safeguard for the moving reflective member and is taken into account with the electromagnetic design of the feed system.

It has proven to be particularly advantageous if the line structure is a circular hollow conductor, preferably a cylinder with a piston, as a reflective member. A circular hollow conductor of this type can be for example a pneumatic cylinder or a hydraulic cylinder. The disadvantages which have been experienced to date are therefore dispelled in particular for these applications.

Due to the presence of boreholes in the feed block into which the restraint system, the coupling probe and the coaxial feed region can be inserted, simple fitting is provided and the whole distance measuring device can be integrated almost any way into existing line structures.

It has also proved to be advantageous if the coupling probe is designed as a monopole stimulation system and the electromagnetic wave feed is implemented coaxially so that a circular hollow conductor wave can be fed in and be converted to the monopole by means of a multi-stage coaxial transformation stage. By means of the multi-stage coaxial transformation stage, which can have a level base area on which an electrically conductive cylinder is provided in the center, and to which an electrically conductive pin is attached as an inner conductor of the coaxial feed, it is possible for the whole feed to be implemented simply.

The restraint system comprises dielectric, e.g. lexan, and is used for the positioning of the coupling probe within the cylinder. Furthermore, it provides the required mechanical stability when subjected to pressure (e.g. 10 bar in the pneumatic cylinder). During series production the feed block can be produced particularly cost-effectively by the monopole stimulation system being inserted into the cylinder cover and the dielectric restraint system connecting said system to the cylinder cover by means of the plastic injection method.

An electromagnetic wave in the high frequency range of between 100 MHz and 25 GHz also may be fed in. Dependently upon the dimensions and measurements of the cylinder used as the line structure and the wave mode, an appropriate frequency is chosen which is above the lower limit frequency of the wave mode used.

In FIG. 1 the distance measuring device 11 according to various embodiments is illustrated with a line structure 1 and a feed block with a feed region 2, the feed region having a coupling probe 3 via a dielectric restraint system 5 with the waveguide 7. In addition, the dielectric secondary ring 9 is illustrated which serves on the one hand as a mechanical stop safeguard and is designed as a secondary adjustment and radiation system.

Figure 2:
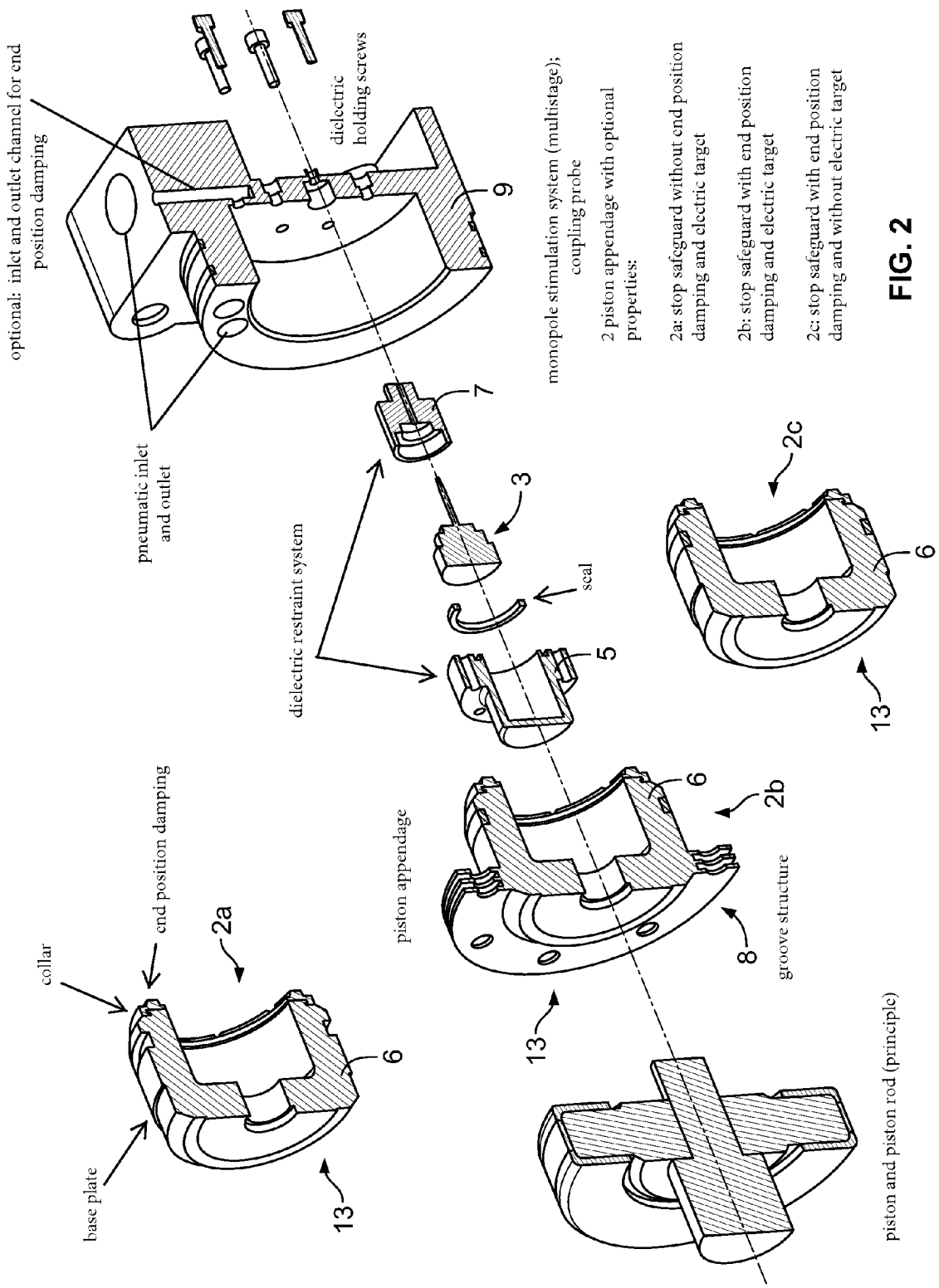
FIG. 2 shows perspectively an exploded view of the distance measuring device according to various embodiments (left-hand side) and of the distance measuring device according to various embodiments in the assembled state (righthand side)
Figure 4:
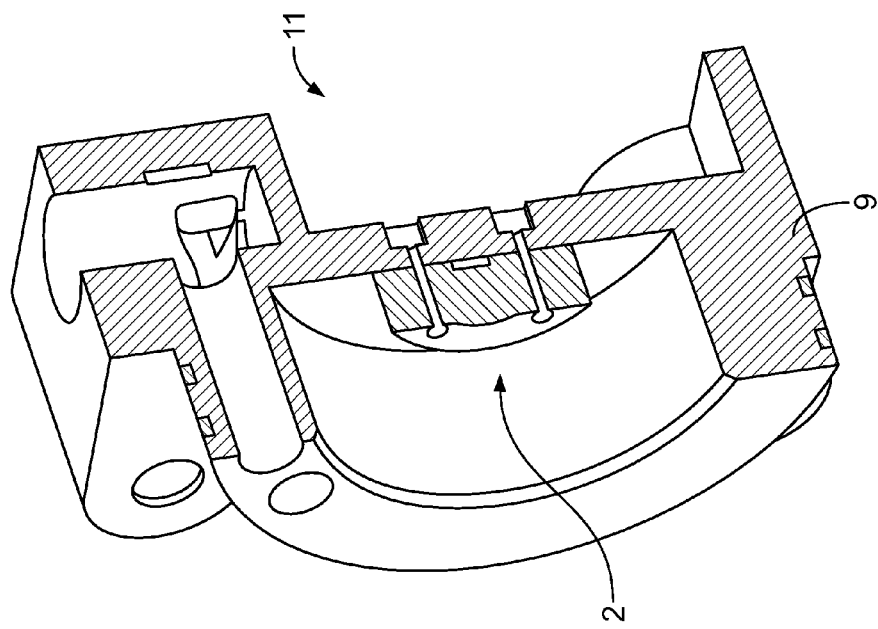
FIGS. 3-9 show further sectional illustrations of different embodiments (or portions thereof) of the distance measuring device.
Figure 3:
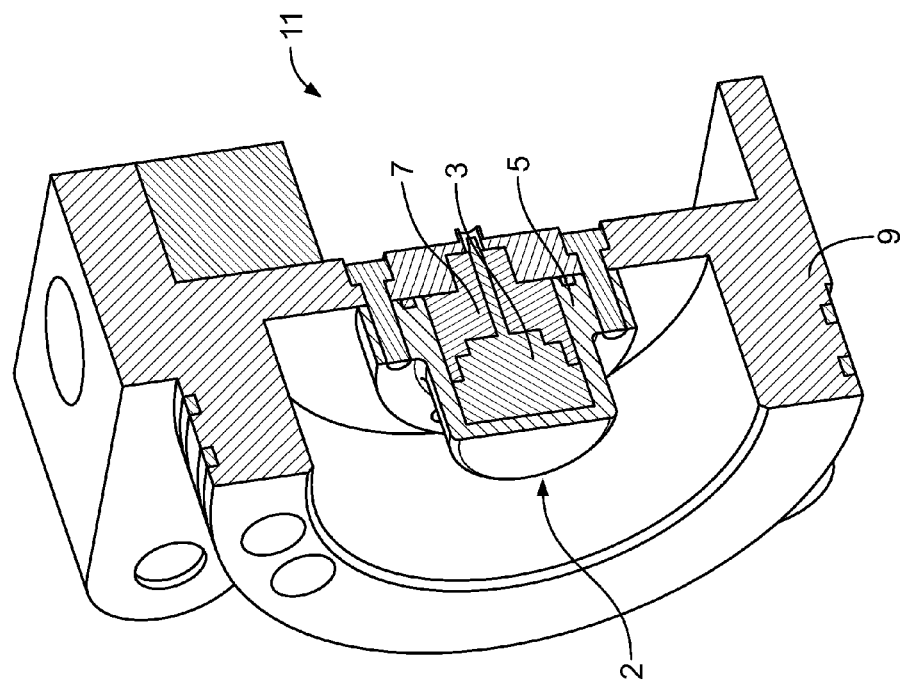
Figure 5:
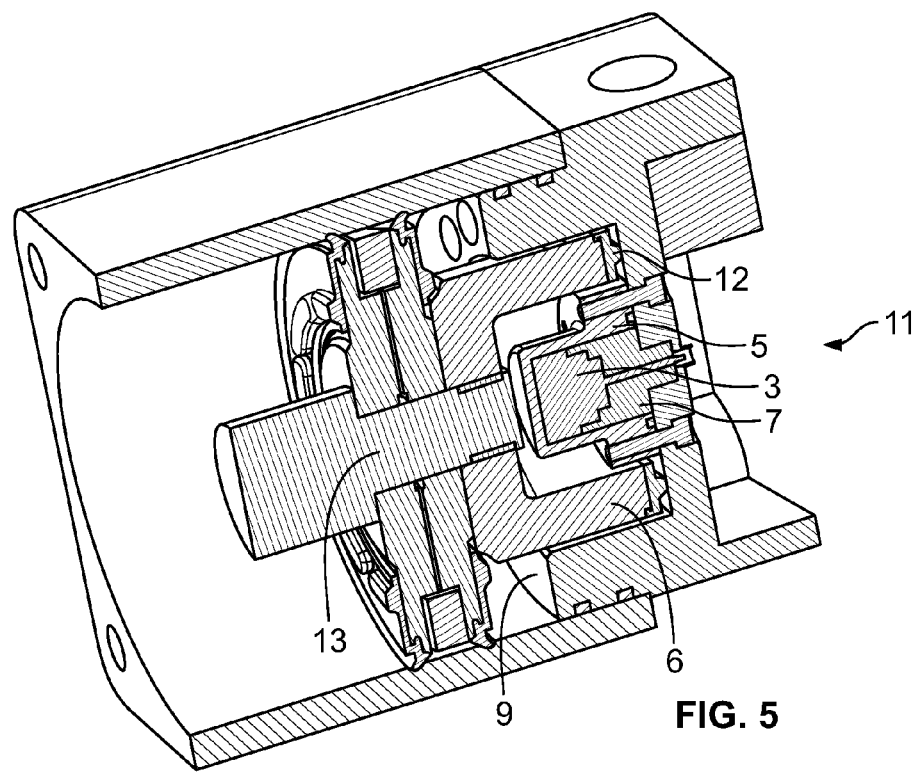
Figure 6:
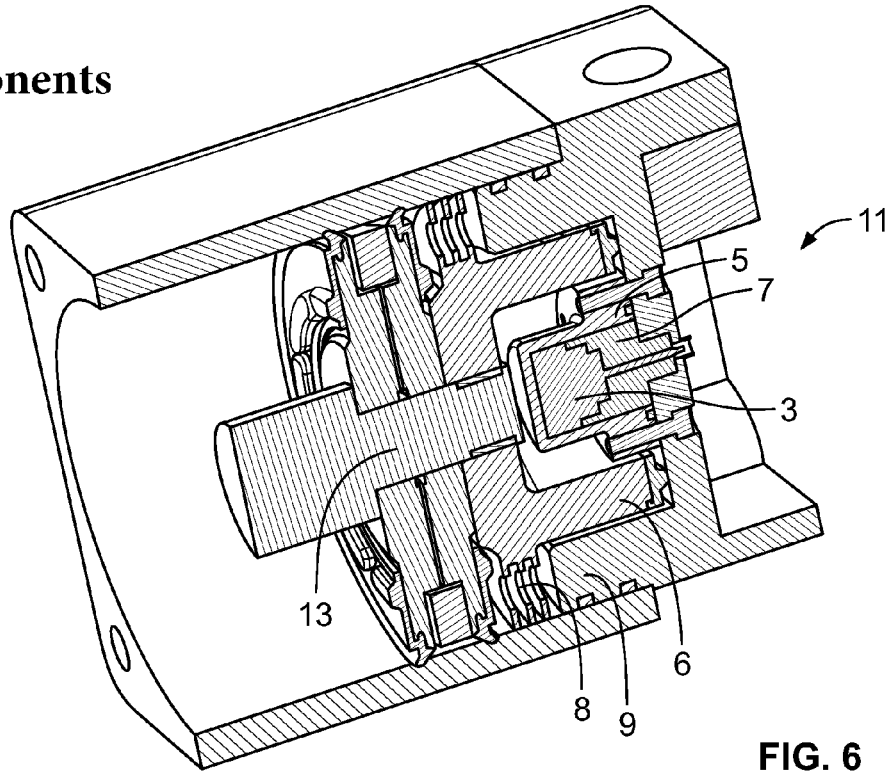
Figure 8:
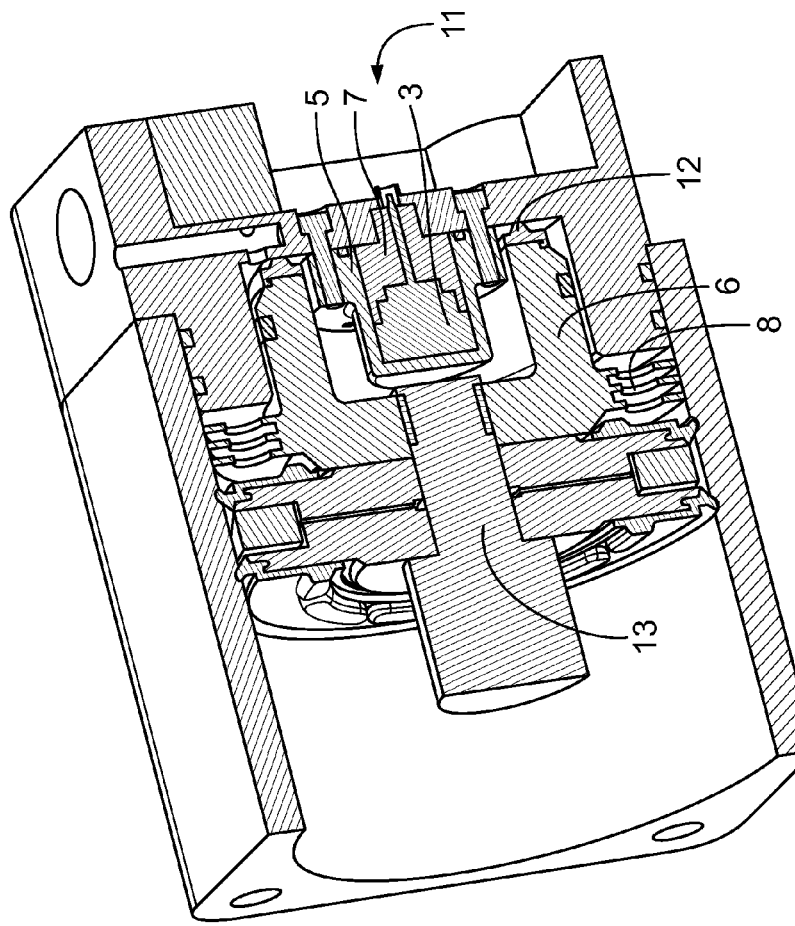
Figure 7:
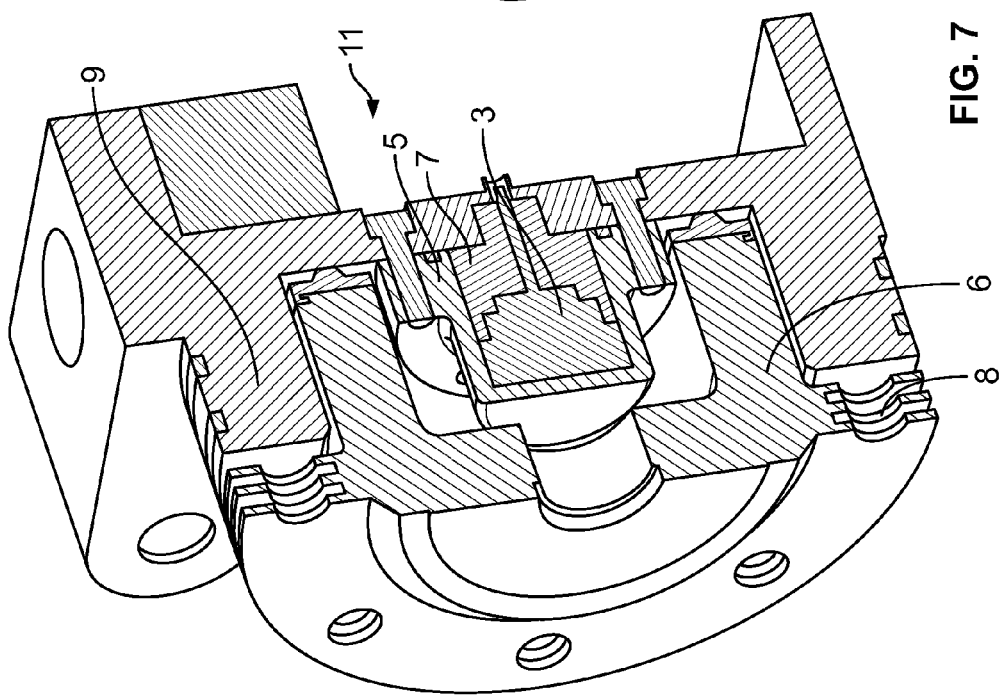

The respective components of the distance measuring device according to various embodiments are illustrated more clearly in FIG. 2, with components such as the feed block with the feed region 2 being reproduced in an exploded view. It can also clearly be seen that the dielectric restraint system holds the coupling probe 3 in the form of a monopole stimulation system which includes a pin which can be accommodated in a coaxial waveguide. In addition the dielectric secondary ring 9 is shown. Likewise, the reflective member 13 with the attached collar for forming a cup-like element, the base plate of which advantageously has a groove structure, is shown.

For better understanding the mode of operation of the distance measuring device according to various embodiments and of the method for determining the distance will be described more clearly.

The feed system comprises a coaxial monopole stimulation system. By feeding a transversally electromagnetic wave, i.e. TEM wave in the coaxial feed and input region 3, by means of the monopole system a circular hollow conductor wave with the characteristic E field type of the E01 wave is stimulated. This wave propagates within the running cylinder in the axial direction. If this wave strikes a reflective member, i.e. in the pneumatic and hydraulic cylinder the piston, the wave is reflected and converted by the stimulation section (monopole) into the coaxial line system and conveyed on to a HF transceiver (transmitting and receiving unit). The monopole feed comprises a multi-stage coaxial transformation stage as a coupling probe 3 with a dielectric restraint system 5, for example, made of PPS Gf 40 material, for positioning and pressure stabilization. With cylinders with a large diameter the dielectric restraint system is partially designed in the form of dielectric supports. The piston end stop is provided by means of a cup-shaped part 6 made e.g. of aluminium, which is fitted on the piston as an end piece. Here the cup is designed such that upon impact the antenna plunges without contact inside the cup. A plastic plate 12 is accommodated on the front face of the cup in order to enable a soft impact. This cup serves additionally as a reflective member for the transmitted electromagnetic wave.

In order to achieve ideal reflection conditions so-called "corregations" 8 have been provided around the periphery of the reflective member. These are milled grooves which constitute a short circuit for the electromagnetic wave. Depending on the number of grooves an almost perfect short circuit can therefore be produced. In practice two grooves are sufficient. The depths of the grooves correspond to approx. a quarter of the wavelength of the transmission frequency of the electromagnetic wave used when air is located in the grooves. The depth of the grooves can be shortened substantially if the latter are filled with dielectric e.g. teflon. In practice dielectric rings will be inserted.

A further embodiment of the reflective member is such that it can be formed to enable the execution of the function of end position damping. Without end position damping the piston would strike the cover without any deceleration. This leads to jolts and can cause damage to the drive system. Classic end position damping is implemented in that the piston rod projects over the piston towards the sensor and is provided with a conically extending plastic attachment. The counterpiece in the end cover forms a synthetic ring the inner diameter of which is of a size such that the piston rod can plunge in with a conically extending plastic attachment. If the inner diameter of the plastic ring corresponds to that of the outer diameter of the conical piston rod attachment, the piston is then decelerated. In order to enable the cylinder to start up smoothly following a deceleration process, the plastic ring is mounted in the cover such that it can move axially e.g. a few millimeters. If the piston starts up again following a deceleration process, then it carries the plastic ring with it up to the latter's stop. By means of the kinetic energy which the piston then has there is a gentle jolt and the plastic ring is released from the conical plastic attachment of the piston rod. The deceleration process is supported by an air exchange between the cover and cylinder space which can be adjusted by means of a screw. The disadvantage for the HF path measuring system is that the movement of the plastic ring within the cover space changes the physical circumstances for the sensor and in this way the measuring accuracy is substantially worsened. Classic end position damping can also be implemented with the proposed configuration. The plastic ring sits in the cover and the conical extension of the piston rod is implemented on the reflective member. The advantage of this solution is that the movement of the plastic ring is now masked by the cup, i.e. the sensor signals are no longer interfered with by the plunging of the antenna into the cup by the movement of the plastic ring.

An equally advantageous embodiment is achieved if the work scheme is reversed. The moveable plastic ring is now fitted onto the outer surface of the cup and the cover plunge surface is formed conically due to the application of a plastic ring. The movement of the ring over the reflective member does not effect the electromagnetic wave because the plastic ring is no longer located close to the antenna.

All of the plastic parts directly adjacent to the monopole antenna are made of a plastic material with low water absorption such as e.g. PPS Gf 40.

An account of the method according to various embodiments will now by given by means of a pneumatic cylinder. Here the whole pneumatic cylinder between the piston rod and the rearward cover e.g. as a circular hollow conductor will be considered. The transmission frequency of the sensor is chosen according to the geometric dimensions of the cylinder such that monomodal propagation of the electromagnetic wave (in the example in the E01 mode) is possible and that the stimulation of hollow conductor wave modes of a higher order is prevented. The stimulation of hollow conductor modes of a lower order is prevented by the geometry of the feed. Stimulation of the electromagnetic wave in the cylinder takes place e.g. via a monopole in the way presented. The wave propagates in the circular hollow conductor (=pneumatic cylinder) according to the reflectometer principle and is reflected on the piston (=short circuit). In order to be able to measure the distance between the piston and the coupling probe continuously, the transmission signal must be modulated. This can take place in the form of a frequency modulation. In order to achieve a high distance resolution here a large frequency shift is required however. In practice transmission of a CW signal is more advantageous, e.g. with three different frequencies (for example: 5.8 GHz, 6.0 GHz, 6.2 GHz) in order to establish a clear distance range with respective subsequent analysis of the phase difference between the transmitted and received signal as a highly accurate measured value for the distance between the coupling probe and the piston. The number of frequencies to be used and the position of the latter is first and foremost dependent upon the maximum distance to be measured and the required error tolerance in relation to the phase angle measurement. In general, with a small frequency difference between two measured frequencies the maximum measurable distance is greater, but the difference between two consecutive periods requires greater accuracy of the phase angle measurement than with a greater frequency difference. Resistance to interference is therefore higher with greater differences between the individual measuring frequencies.

If a large measuring range with sufficient resistance to interference is to be measured, a number of measuring frequencies with a suitable frequency position are required. For this reason frequency pairs both with a small difference in transmission frequency (large measuring range) and with a large frequency difference (interference resistance) are then used.

The position accuracy is substantially determined by the accuracy of the phase angle measurement with the highest measuring frequency because the wavelength is the smallest here. The following formula applies:

path change=phase angle change×wavelength/180°

The piston position measurement by means of a microwave is based upon the following principle: An electromagnetic wave of an appropriate frequency is coupled into the cylinder. The cylinder itself acts as a line structure for the wave. The wave passes in the cylinder to the piston as a reflective member. On the piston the electromagnetic wave is largely reflected because the piston behaves electrically similarly to a short circuit. The reflected wave runs back to the cylinder and is uncoupled from the cylinder again by means of the same structure by means of which the coupling also took place. The phase angle between the coupled and the reflected signal is measured. If the piston changes its position, the path over which the electromagnetic wave passes within the cylinder also changes. The path change also brings about a change to the signal duration and so also another phase angle between an incoming and reflected wave. Therefore, the phase between the incoming and returning signal can be used as a measure for the piston position. The following correlation between the piston position and the phase angle q results:

$$\varphi = \frac{2x \times 360°}{\lambda} + \varphi_o$$

$\varphi_o$ here is a phase offset which is mainly determined by the supply and the coupling. It is constant and so has no effect upon the actual position measurement. The above equation also gives the required phase measurement accuracy in order to be able to achieve a pre-specified position measurement accuracy.

Since with a phase measurement one can basically not distinguish between a phase angle $\phi$ and $\phi+n*360°$, when using just one frequency only cylinders up to a maximum piston stroke $<\lambda/2$ could be measured. When using two or more frequencies it is possible, however, to measure pistons with a substantially greater length. With two frequencies the two wavelengths must not differ too greatly. For a cylinder with length l the following applies for the wavelengths:

$$\lambda_1 > \lambda_2 > \frac{2l\lambda_1}{2l+\lambda_1}$$

Since the phase angle of the reflected signal can not be measured directly and so the voltage measured on a mixer outlet is not directly proportional to the piston position, an appropriate algorithm is used for the position search. Since the output signal is periodically repeated, it must be ensured above all that the position search runs clearly, i.e. it must be possible to determine clearly in which period the piston is located. One possibility for determining the position is to record many measured values during one frequency sweep. These measured values are then transformed by means of a FFT or DFT into the frequency range. From the position of the maximum of the spectrum produced the position of the piston can then be determined. If sub-sampling when recording the measured values is not allowed with this method no problems associated with ambiguity can occur. By means of this method values for the piston positions are obtained without recording a position table. Disadvantageous is the fact that on the one hand a relatively large number of measurement points have to be recorded, and that the time required for calculation is relatively great.

Another possibility is to measure with only a few frequencies and to determine the piston position by means of position tables. The measured values are thus compared easily with the values of the points of the position table. The position established then corresponds to the table value which is most similar to the measured values. It is a disadvantage with this method that ambiguities may occur. Since direct phase measurement is not implemented, clarity can not be guaranteed by observing the condition described above. More precise investigations show that when using just two measuring frequencies there are always points with identical measured values if the cylinder is longer than $\lambda/2$.

Since in practice this is mostly the case, at least three frequencies may be used. If the three measuring frequencies are chosen wisely, there are then no more positions with which all three measured values are identical. However, in practice the measured values must differ by a minimum amount at two piston positions in order to be able to guarantee clarity, even with certain measuring errors. Therefore, with larger cylinder lengths in particular the use of more than three frequencies can be advantageous. Moreover, in this way the measuring accuracy is also increased because noise or measuring errors which only occur with one frequency are suppressed.

The transmitted and received signals are generated in corresponding HF electronics. For this purpose the coax conductor (=pin of the monopole) is connected via a solder joint, plug or bond connection which carries the HF electronics to the conductor board. The HF electronics 20 are in the form of a single chip substrate made e.g. of silicium germanium. The components which are provided here are shown by the block diagram, HF chip. An oscillator (VCO=voltage controlled oscillator) generates the high frequency signal, e.g. with 24 GHz. The oscillator frequency is stabilized by a control loop. For this purpose the oscillator output signal is split into the frequency, e.g. by factor 16 and adjusted with quartz accuracy by means of a PLL. In the transmission branch there is then a switchable divider which establishes the final transmission frequency by means of the divider ratio. With an oscillator frequency of 24 GHz this can be 12, 6, 3, . . . GHz. The associated power amplifier corresponding to the frequency is activated by an external circuit according to the chosen divider ratio. The signal is then radiated via the monopole antenna. After the electromagnetic wave has been reflected on the reflective member, it is received via the monopole antenna and forwarded to the receiver via two directional couplers. The receiver is in the form of an IQ receiver. According to the frequency set the intermediate frequencies of the receiver (IF out) undergo analog/digital conversion and are analyzed in an FPGA (free programmable gate array). Consequently the distance value between the sensor and the piston are obtained. The latter is passed either analoguely e.g. via a 0 to 20 mA or 0 to IOV interface or digitally e.g. CAN bus to a SPS. In the FPGA the function blocks DSP (digital signal processor), parts of the interface, memory and parts of the PLL control are provided.

It should basically be emphasized that the principle of end position damping can be implemented in reverse in the sense of a kinematic reversal, i.e. the moveable plastic ring is located in the cover and the conically extending plastic pin on the outer surface of the cup.

According to FIG. 13 a-d a sequence of the reflective member at an end position of the reflective member with the feed block is shown. Here the implementation of the pneumatic end position damping when using the integrated microwave sensor is primarily described, and in particular in contrast to the previously described implementation with central damping which is not possible because the microwave antenna or the coupling probe for feeding a transmission signal sits here. At this point it is emphasized that this type of damping can also be used, however, for cylinders without microwave sensor systems.

The basic structure characteristically shows a centrally positioned coupling probe, a reflective member in the form of a cup piston with a base plate and an attached collar and a plunging region for the cup piston in the cylinder floor provided as a recess in the feed block.

FIG. 13 a shows functionally how the cup piston approaches the cylinder floor. In FIG. 13 b the piston engages in the plunge region of the cylinder floor and closes the air seal in the recess by means of the sealing ring so that upon further movement of the piston overpressure is established in the recess of the feed block. In FIG. 13 c a snap-shot is shown in which the piston is moved into the plunge region of the recess, and the overpressure in the region around the coupling probe is slowly broken down by a bypass borehole that is also provided. In FIG. 13 d it is shown how the cup piston is moved out by applying pressure to the cylinder floor, and the air seal opens. Around the air seal compressed air can flow into the cylinder and exert force over the whole piston region.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

Figure 9:
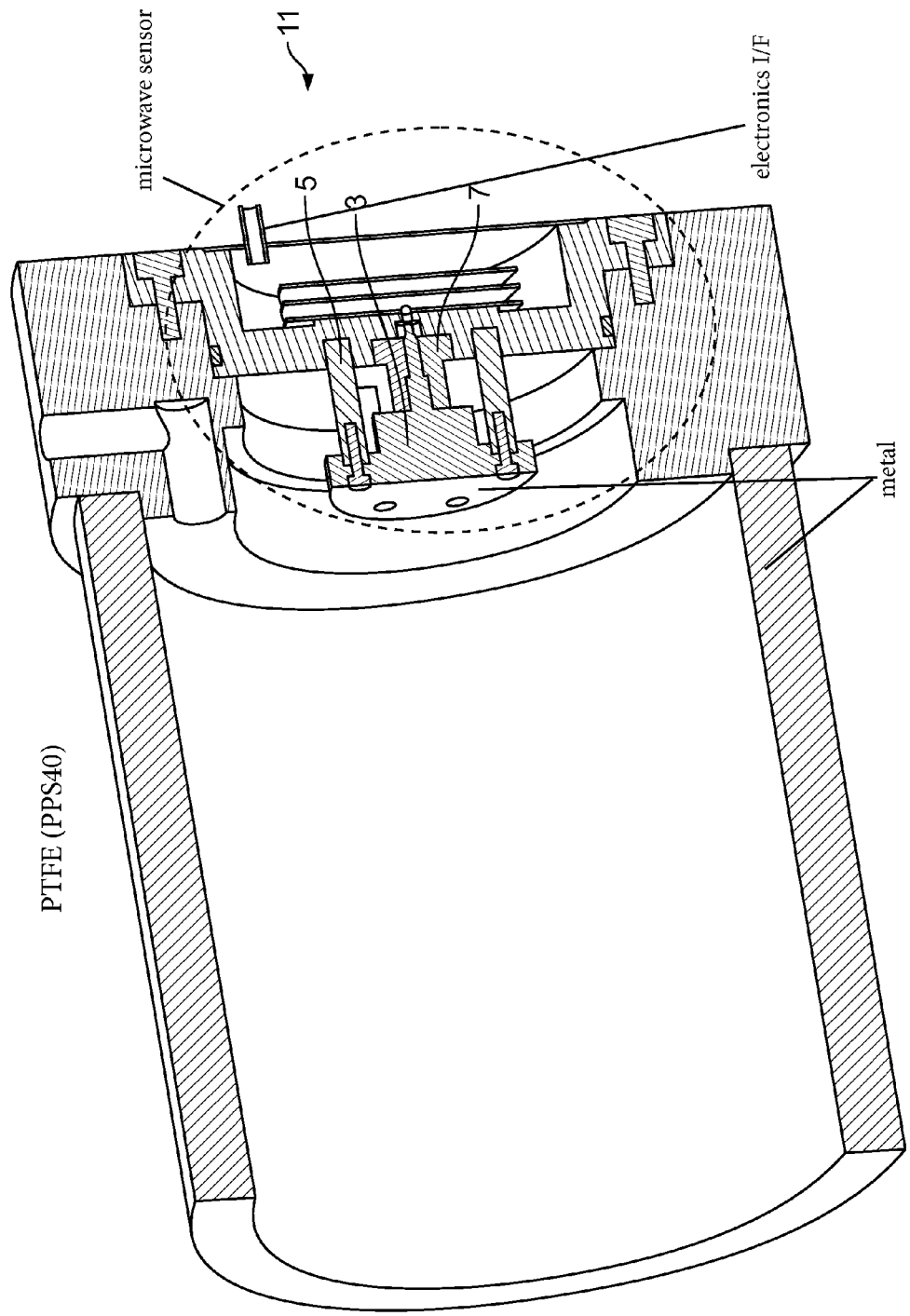
Figure 10:
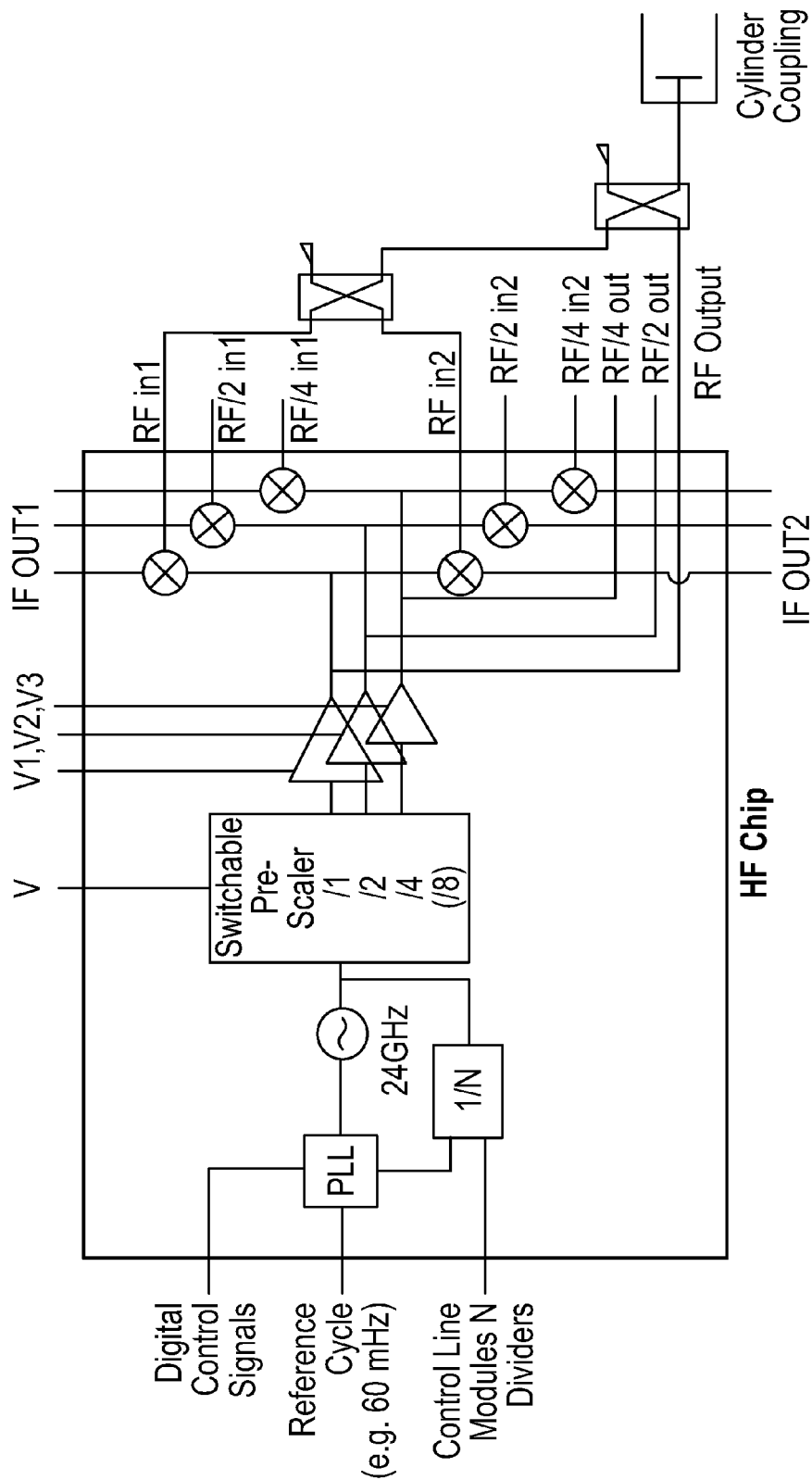
FIG. 10 shows a block diagram of the analysis electronics.
Figure 11:
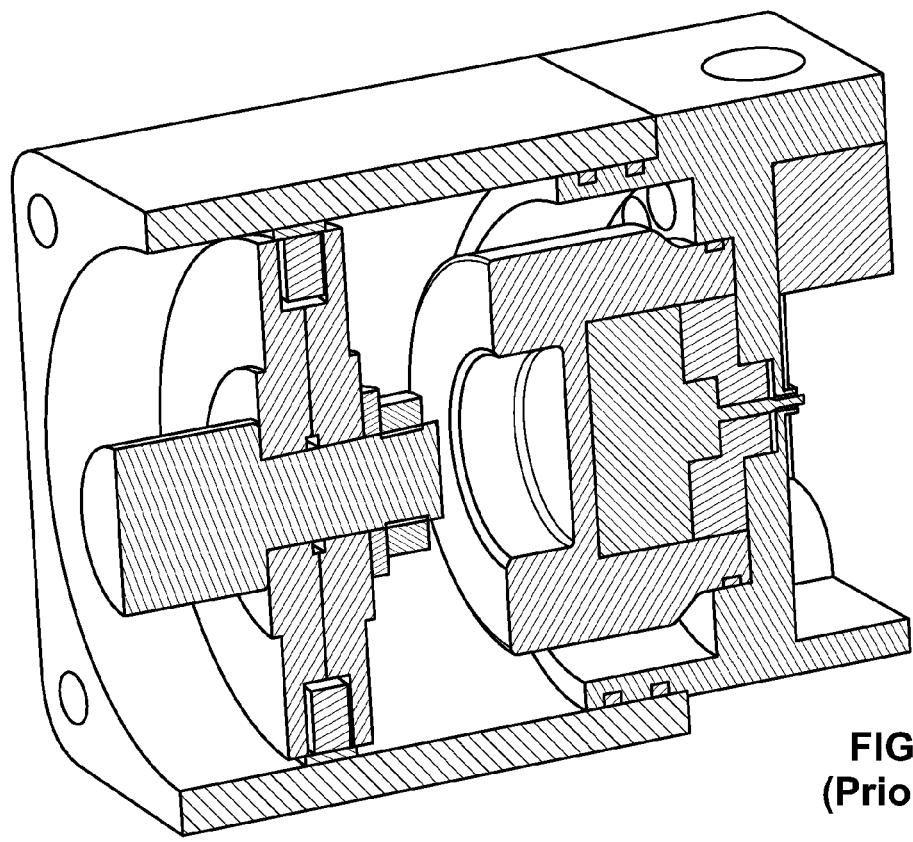
FIGS. 11 and 12 show line structure arrangements according to the prior art.
Figure 12:
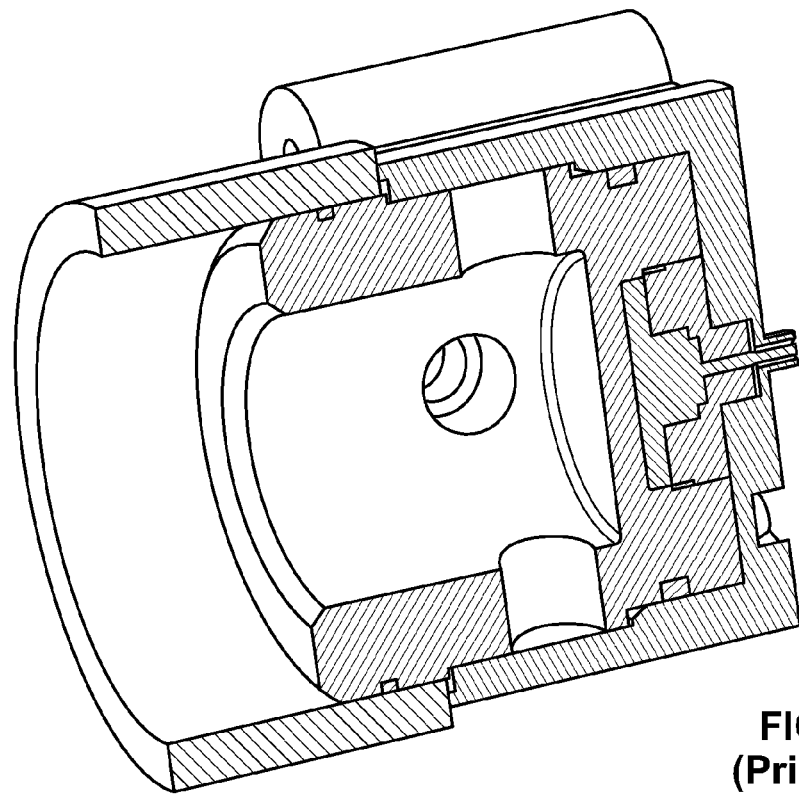
Figure 13A:
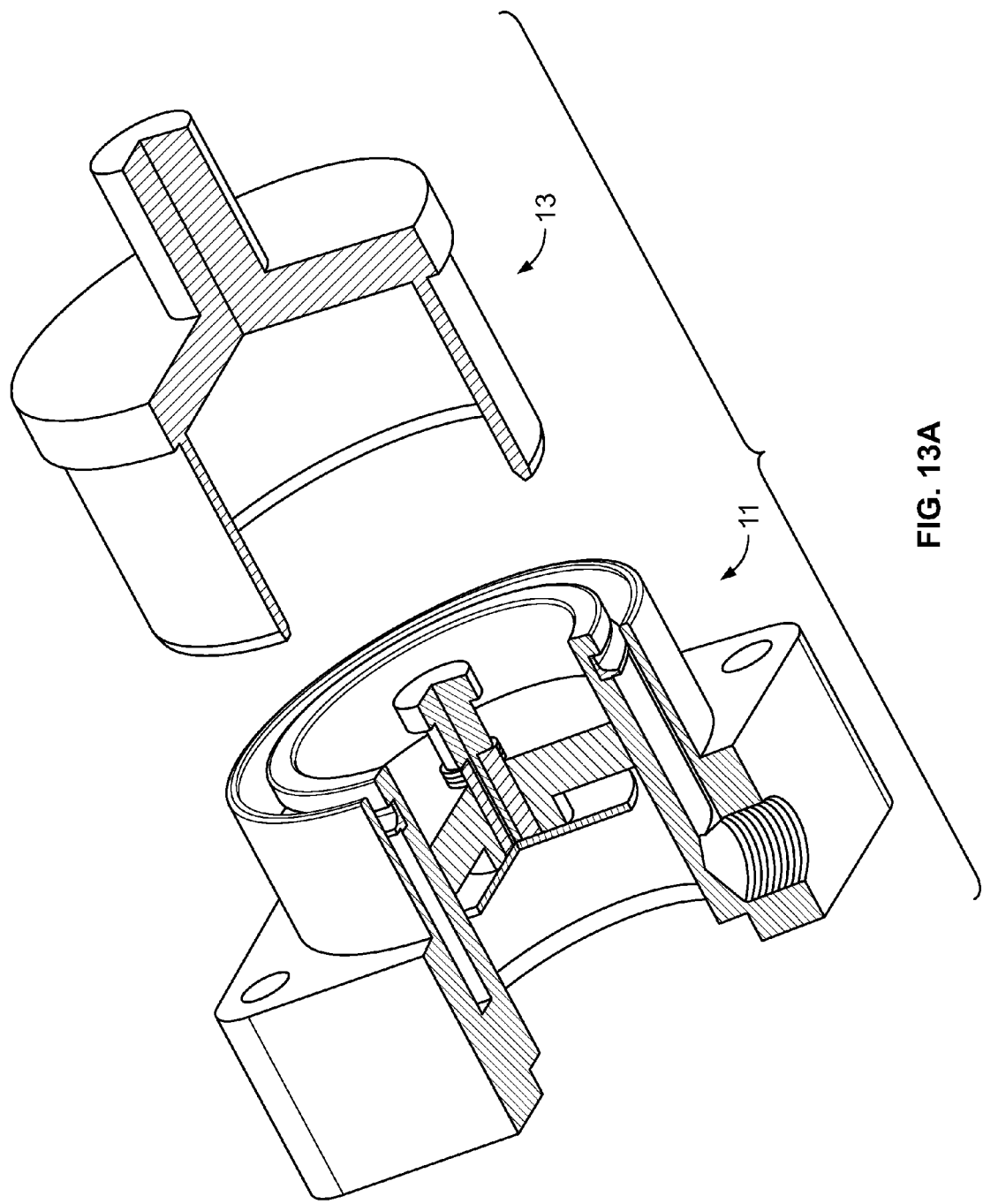
FIG. 13 a-d shows a sequence of the reflective member at an end position of the reflective member.
Figure 13B:
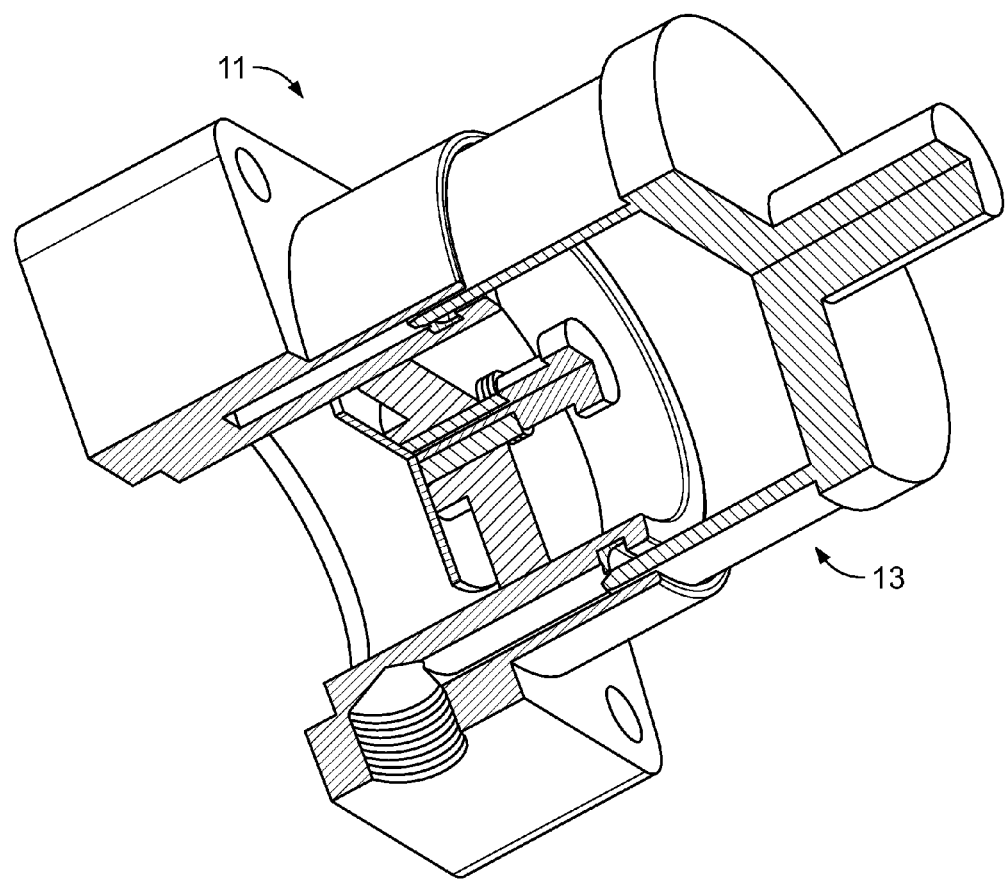
Figure 13C:
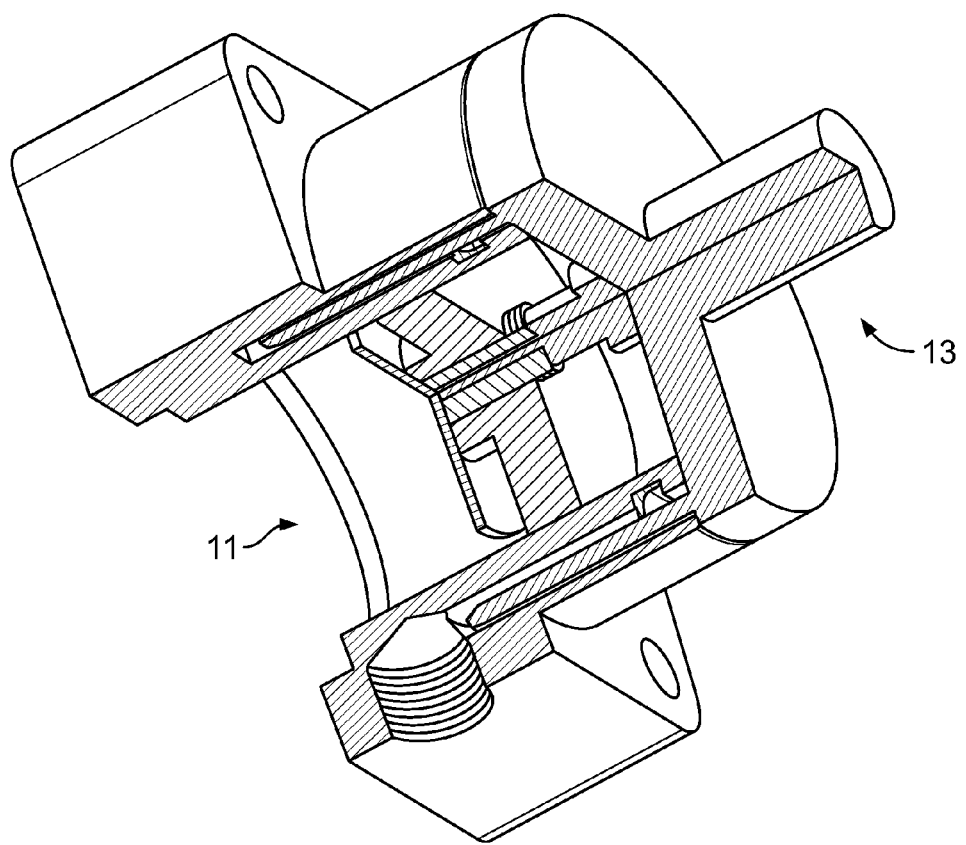
Figure 13D:
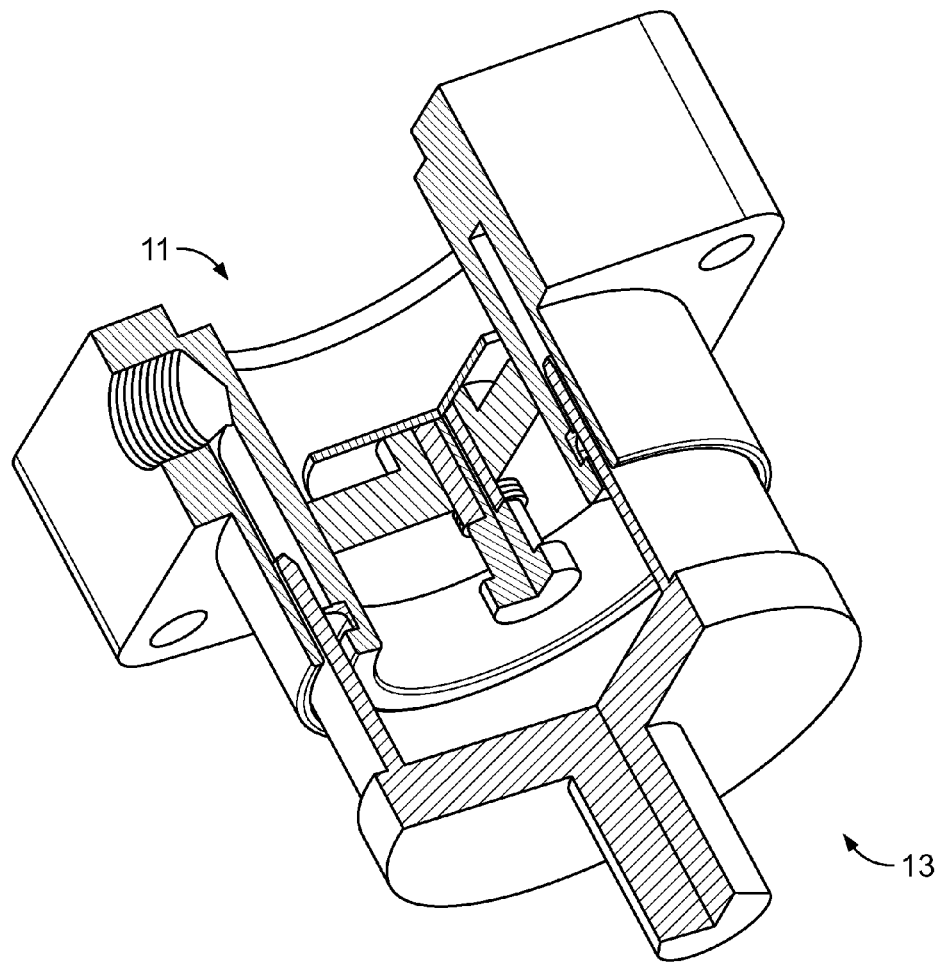

| Key to Figures: |
| --- |
| FIG. 1 |
| microwave stimulation<br>piston and piston rod (principle)<br>   piston appendage and reflective member<br>      with optional properties |
| FIG. 2 |
| Components |
|         Optional:<br>          inlet and outlet channel<br>          for end position<br>          damping<br>        pneumatic inlet and outlet<br>collar<br>base plate<br>   end position damping<br>      dielectric restraint system<br>         dielectric holding<br>         screws<br>   piston appendage<br>      monopole stimulation system (multi-stage); coupling probe<br>      seal |
| groove structure        2 piston appendage with optional properties:<br>           2a; stop safeguard without endposition damping and electric target<br>           2b: stop safeguard with end position damping and electric target<br>piston and piston rod (principle)     2c: stop safeguard with end position damping and without electric target |
| FIGS. 3, 4, 6 and 8 |
| Components |
| FIG. 9 |
|                              microwave sensor<br>                             electronics I/F<br>   metal |
| FIG. 10 |
| digitate Steuersignale =        digital control signals<br>Referenztakt (zB. . . . ) =        reference cycle (e.g. . . . )<br>Steuerfeitungrnodule N Teller =    control line modules N dividers<br>Zylindereinkopplung =           cylinder coupling<br>Blockschaltbild HF chip =       block diagram HF chip |
| FIGS. 11 and 12 |
| Prior art |

What is claimed is:

1. A distance measuring device comprising:
analysis electronics and a sensor device which has at least one coupling probe for feeding a transmission signal into a line structure and with a reflective member disposed in the line structure which has a base plate with an attached collar forming a cup-shaped element; and a feed block with a recess into which the collar plunges, the recess having a sealing ring which produces airtightness with the collar, wherein the attached collar is provided on the front face with a plastic plate; and an annular element formed from a plastic ring that includes the collar in an end position and configured to provide an end position damping.

2. The distance measuring device according to claim 1, wherein the attached collar comprises the coupling probe in an end position of the reflective member.

3. The distance measuring device according to claim 1, further comprising a groove structure in a front face of the base plate extending in a circumferential direction.

4. The distance measuring device according to claim 3, wherein the groove structure includes at least two grooves.

5. The distance measuring device according to claim 3, wherein the groove structure includes a plurality of the grooves filled with dielectric material.

6. The distance measuring device according to claim 1, wherein the line structure is a circular hollow conductor, including a cylinder with a piston as a reflective member and the plastic ring is mounted in a cover of the cylinder and configured to move axially.

7. The distance measuring device according to claim 1, further comprising an annular element formed from a plastic ring provided on an outer surface of the collar and having a surface pairing corresponding to an outer surface of the collar and extends conically in order to provide end position damping.

8. The distance measuring device according to claim 1, wherein the line structure is a circular hollow conductor, including a cylinder with a piston as a reflective member.

9. The distance measuring device according to claim 8, wherein the reflective member is attached to the piston.

10. The distance measuring device according to claim 1, wherein the coupling probe comprises a monopole stimulation system, and the feed of a electromagnetic wave implemented coaxially and converted to the monopole via a multi-step coaxial transformation.

11. The distance measuring device according to claim 1, wherein the coupling probe comprises a three-step transformation module having a level base on the center of which a cylinder is provided to which a pin is attached and wherein a feed region is connected to the coupling probe.

12. The distance measuring device according to claim 11, wherein the coupling probe is covered by a plastic material with low water absorption and water release.

13. The distance measuring device according to claim 12, wherein the plastic material comprises a PPS Gf 40 material.

14. The distance measuring device according to claim 1, wherein the line structure includes a feed block with a feed region that connects an HF transceiver to a dielectric restraint system with the coupling probe via a wave guide.

15. The distance measuring device according to claim 14, wherein the dielectric restraint system is formed from a material with low water absorption and release and configured to be implemented in one of solidly and in individual supports with cylinders with a large diameter.

16. The distance measuring device according to claim 14, wherein pneumatic pressure compensation is provided.

17. The distance measuring device according to claim 14, wherein the feed block includes boreholes into which the restraint system, the coupling probe and the coaxial feed region are configured to be inserted.

18. The distance measuring device according to claim 1, wherein the transmission signal is fed as an electromagnetic wave in a high frequency range via the coupling probe.

19. The distance measuring device according to claim 18, wherein the electromagnetic wave is in a high frequency range of between about 100 MHz and about 25 GHz.

20. The distance measuring device according to claim 1, wherein at least two transmission signals are radiated as electromagnetic waves with different frequencies via the coupling probe.

21. The distance measuring device according to claim 20, wherein the coupled electromagnetic wave has monomodal propagation in the TEM mode with a coaxial structure.

22. The distance measuring device according to claim 20, wherein the coupled electromagnetic wave has monomodal propagation in the E01 mode with the circular hollow conductor.

23. The distance measuring device according to claim 1, wherein the sensor device includes high frequency electronics with a transmitting and receiving branch.

24. The distance measuring device according to claim 23, wherein the high frequency electronics comprises a PLL, an oscillator (VCO), a mixer, frequency distributors and amplifiers integrated onto a common substrate.

25. The distance measuring device according to claim 24, wherein the common substrate material being at least one of silicium germanium, silicium, silicium germanium carbide and silicium carbide.

26. The distance measuring device according to claim 1, wherein at least one of the analysis electronics and the sensor device being provided as interface electronics in a chip arrangement on the feed block.

27. The distance measuring device according to claim 26, wherein the transmitting and receiving frequency of the chip arrangement is selectable by adjusting a divider ratio by applying an external voltage in discrete steps.

28. The distance measuring device according to claim 1, wherein the analysis electronics comprises a DSP, a PLL, and memory implemented as a Free Programmable Gate Array (FPGA).

29. The distance measuring device according to claim 28, wherein the interface electronics are implemented with analog and digital operations and at least a portion of the FPGA is allocated to the generation of an interface protocol and control of digital to analog conversion.

30. The distance measuring device according to claim 1, further comprising a bypass borehole provided in the feed block.

31. The distance measuring device according to claim 1, wherein the line structure is a circular hollow conductor, including a cylinder with a piston as a reflective member with the plastic ring mounted onto a front face of the cup-shaped element.

32. The distance measuring device according to claim 31, wherein a conical extension of rod of the piston is on the reflective member.

33. The distance measuring device according to claim 1, wherein the plastic ring is coupled to an outer surface of the cup-shaped element and a cover plunge surface is formed conically and coated in plastic.

34. The distance measuring device according to claim 1, further comprising a dielectric secondary ring configured as a stop safeguard for the reflective member when the reflective member is moving.

35. The distance measuring device according to claim 1, wherein the line structure is a circular hollow conductor, including a cylinder with a piston as a reflective member, with the plastic ring mounted in a cover of the cylinder, an internal diameter of the plastic ring complementary and received within an external diameter of a conical piston rod attachment of the piston.

36. The distance measuring device according to claim 35, wherein the plastic ring is mounted in the cover to allow axial movement thereof.

37. A method for determining a distance using a distance measuring device, the method comprising:
providing a line structure reflection which has a feed block with a feed region which connects a high frequency (HF) transceiver to a dielectric restraint system with a coupling probe via a waveguide, and providing a reflective member with a base plate with an attached collar for forming a cup-shaped element;
providing an annular element formed from a plastic ring that includes the collar in an end position and configured to provide an end position damping; and
measuring a distance between a feed point defined by the coupling probe and the reflective member, wherein at least two transmission signals as electromagnetic waves with different frequencies are coupled via the coupling probe.

38. The method according to claim 37, further comprising measuring the distance using a phase difference between the transmitted signal and the received signal of the electromagnetic wave.

39. The method according to claim 38, wherein the difference with at least two transmission frequencies of the respective electromagnetic wave is about one percent of the absolute value, to cover a large measuring range.

40. The method according to claim 37, wherein the transmission signals are continuously radiated.

41. The method according to claim 37, wherein three transmission signals are radiated as electromagnetic waves via the coupling probe.

42. The method according to claim 37, wherein the recess includes a sealing ring with which the collar provides airtightness.

43. The method according to claim 37, wherein the difference between the frequencies of the transmission signal of the respective electromagnetic wave is about twenty percent the absolute value, to achieve high interference resistance.

44. The method according to claim 37, wherein a feed block is provided with an annular recess into which the collar plunges.

45. The method according to claim 44, wherein a bypass borehole is provided in the feed block.

46. A reflective member for a distance measuring device having analysis electronics and a sensor device which has at least one coupling probe for feeding a transmission signal into a line structure and with a reflective member disposed in the line structure which has a base plate with an attached collar forming a cup-shaped element, and a feed block with a recess into which the collar plunges, the recess having a sealing ring which produces airtightness with the collar, wherein the attached collar is provided on the front face with a plastic plate, wherein the reflective member is configured to reflect a high frequency (HF) signal and has a base plate with an attached collar for forming the cup-shaped element, and further comprising an annular element formed from a plastic ring that includes the collar in an end position and configured to provide an end position damping.

47. The reflective member according to claim 46, wherein the attached collar includes a plastic plate.

48. The reflective member according to claim 46, wherein a front face of the base plate comprises a groove structure that extends in a circumferential direction.

49. The reflective member according to claim 48, wherein the groove structure includes a plurality of grooves filled with dielectric material.

50. The reflective member according to claim 46, wherein the groove structure includes at least two grooves.

51. The reflective member according to claim 46, further comprising an annular element provided as a plastic ring, the annular element on an outer surface of the collar.

* * * * *